United States Patent
Carlson

[11] 4,021,794
[45] May 3, 1977

[54] EXTERNAL CONDITION RESPONSIVE CIRCUIT PRODUCING ALARM WHEN FREQUENCY (ENGINE SPEED) TO AMPLITUDE SIGNAL (OIL PRESSURE) RATIO EXCEEDS THRESHOLD

[75] Inventor: Peter J. Carlson, Fort Lauderdale, Fla.

[73] Assignee: Airpax Electronics Incorporated, Fort Lauderdale, Fla.

[22] Filed: Apr. 14, 1976

[21] Appl. No.: 676,873

[52] U.S. Cl. .................. 340/248 R; 340/60; 340/240; 340/248 P; 340/270; 307/233 R; 307/359; 328/138; 307/273; 328/129; 328/48; 328/1
[51] Int. Cl.² ........................................ G08B 21/00
[58] Field of Search ............... 328/1, 48, 207, 129, 328/138; 307/273, 208, 233, 235 K; 340/60, 240, 248 R, 248 C, 248 P, 270

[56] References Cited
UNITED STATES PATENTS

| | | | |
|---|---|---|---|
| 3,576,496 | 4/1971 | Garagnon | 328/48 X |
| 3,723,964 | 3/1973 | Lace | 340/60 X |
| 3,725,794 | 4/1973 | Asplund | 328/129 |
| 3,735,377 | 5/1973 | Kaufman | 328/129 X |
| 3,792,460 | 2/1974 | Ratz | 340/248 P |
| 3,825,744 | 7/1974 | Sibley et al. | 340/248 P |
| 3,976,989 | 8/1976 | Smith | 340/270 |

Primary Examiner—John S. Heyman
Attorney, Agent, or Firm—LeBlanc & Shur

[57] ABSTRACT

Disclosed is a circuit for producing an alarm or shut down signal when the ratio of engine speed to engine oil pressure of a tractor engine becomes excessive. A frequency signal from a speed transducer is applied to a digital counter having a counting cycle varied in accordance with a voltage signal from a pressure transducer. The voltage signal is converted to current and used to determine the period of a one shot multivibrator.

20 Claims, 4 Drawing Figures

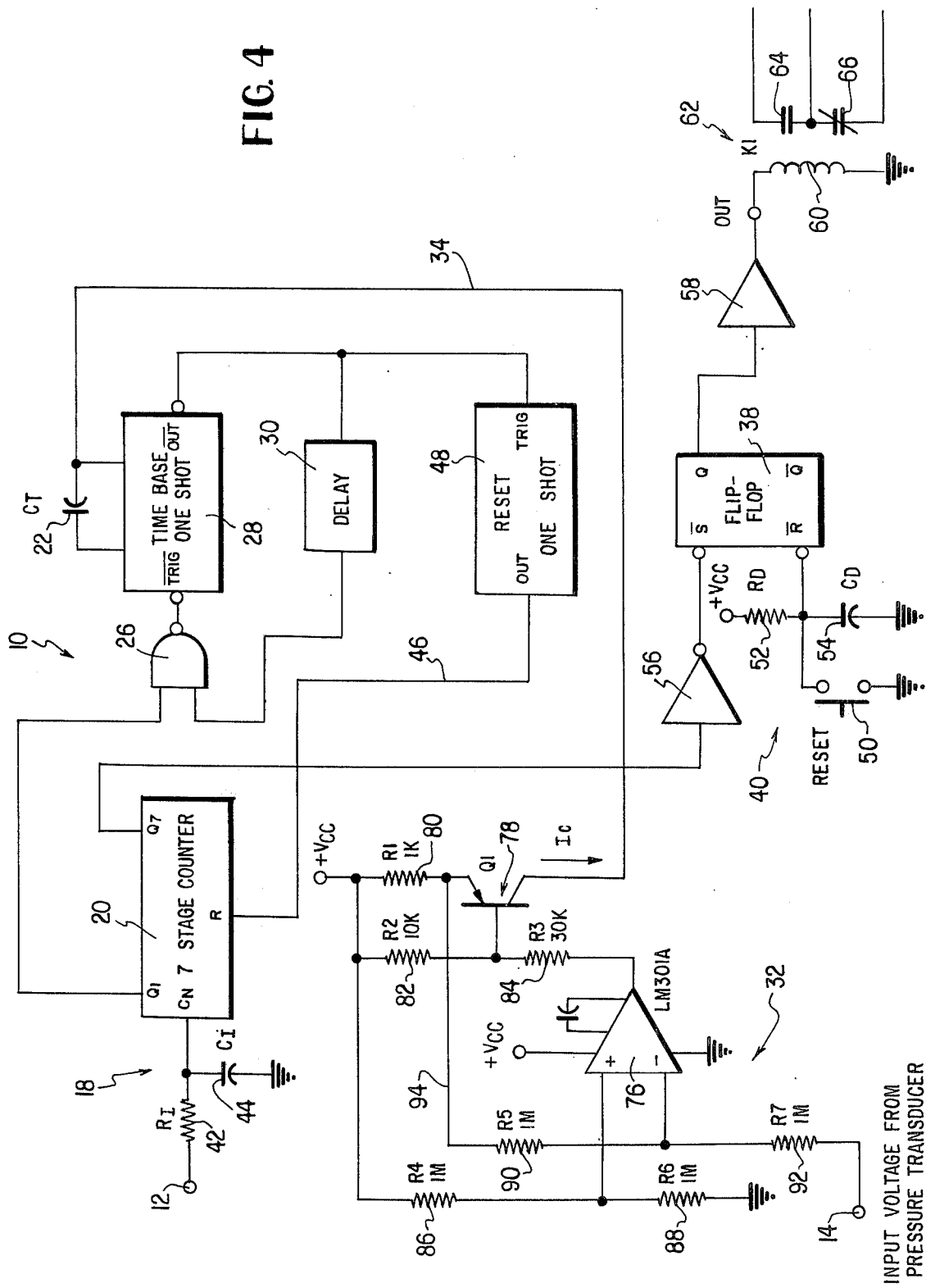

EXTERNAL CONDITION RESPONSIVE CIRCUIT PRODUCING ALARM WHEN FREQUENCY (ENGINE SPEED) TO AMPLITUDE SIGNAL (OIL PRESSURE) RATIO EXCEEDS THRESHOLD

This invention relates to a digital alarm circuit and more particularly to a simplified circuit for producing an alarm when the ratio of a first input signal variable in frequency to a second input signal having a variable analog magnitude exceeds a predetermined value. It is particularly adapted for producing an alarm or a shut-down signal for an internal combustion engine when the ratio of engine speed to engine oil pressure becomes excessively high.

Oil pressure switches and alarms which signal or operate when the oil pressure of an internal combustion engine falls below a certain level are well known. These devices are provided to prevent catastrophic engine failure since operation of an internal combustion engine for even a very short time without oil resulting from an oil leak can cause very serious damage. However, the oil requirements of an engine vary substantially with engine speed and there is a need for a simplified and inexpensive device which provides a shut-down signal for an engine when the oil pressure versus speed curve falls below a critical value. The device of this invention provides such a simplified circuit in which a frequency indicative of engine speed divided by an analog signal indicative of oil pressure is compared with a constant and if too high produces an alarm. While described in conjunction with internal combustion engines and particularly tractor engines, it is understood that the circuit of the present invention is applicable for use wherever a low-cost arrangement is desired for providing a digital output (alarm) based on the computations of A/B where A is a rate (frequency) function and B is an analog voltage.

It is therefore one object of the present invention to provide an improved dividing frequency switch.

Another object of the present invention is to provide a simplified electrical circuit which produces an output when the ratio of an electrical frequency signal to an electrical voltage analog magnitude exceeds a predetermined value.

Another object of the present invention is to provide an electrical shut-down circuit for internal combustion engines.

Another object of the present invention is to provide a simplified warning or shut-down circuit particularly adapted for use with tractor engines.

Another object of the present invention is to provide a simplified digital output circuit which indicates when the ratio of engine speed to engine oil pressure has exceeded a predetermined value.

These and further objects and advantages of the invention will be more apparent upon reference to the following specification, claims and appended drawings wherein:

FIG. 4 is a detailed block diagram of the dividing frequency switch of FIG. 1.

Figure 1:
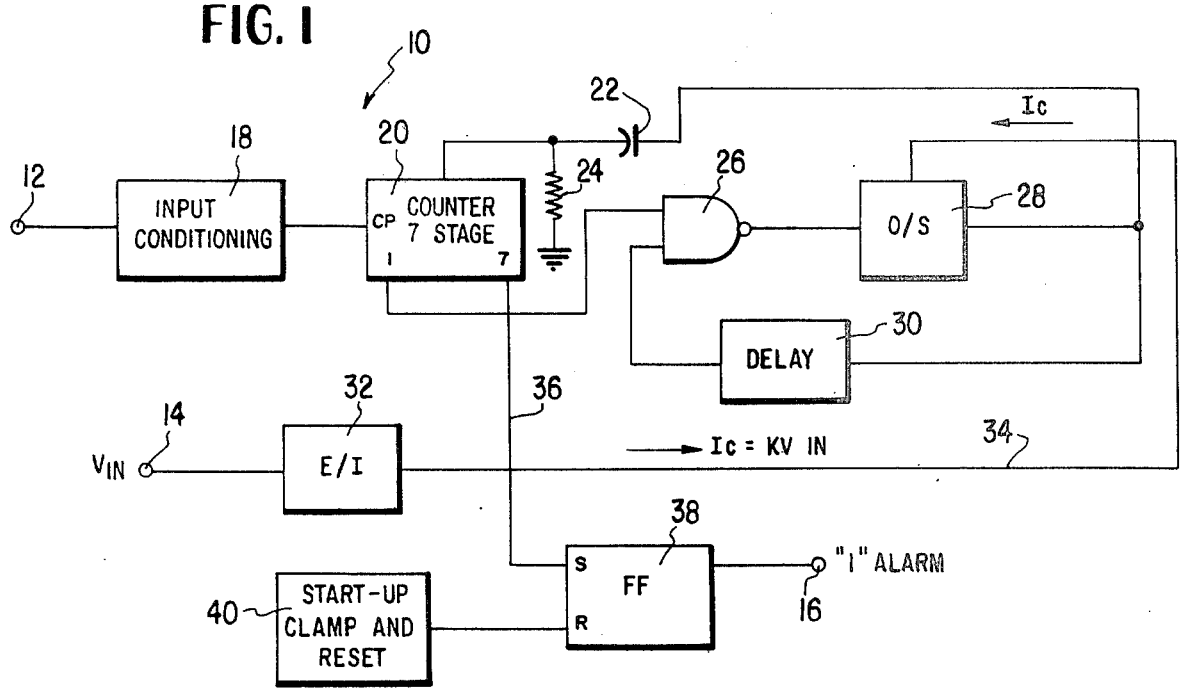
FIG. 1 is a simplified block diagram of the dividing frequency switch of this invention.

Referring to the drawings, the novel dividing frequency switch of the present invention is generally indicated at 10 in FIG. 1 and comprises a frequency input terminal 12, a voltage input terminal 14 and an output or alarm terminal 16. Frequency terminal 12 is connected to an input conditioning circuit 18 whose output is in turn coupled to a seven-stage counter 20. The counter is connected to a timing circuit comprising a capacitor 22 and resistor 24 as well as to a NAND gate 26 and a one-shot multivibrator 28. The output of multivibrator 28 is connected through a delay circuit 30 back to the input of NAND gate 26.

Voltage input terminal 14 connects through a voltage/current converter 32 and by way of a lead 34 to the multivibrator 28. The seven-stage counter 20 is connected by a lead 36 to the set terminal of an RS flip-flop 38 having its reset terminal connected to a start up, clamp and reset circuit 40. The output of flip-flop 38 connects to output terminal 16 and produces a signal which can be used to either actuate an alarm or a shut-down switch.

Figure 2:
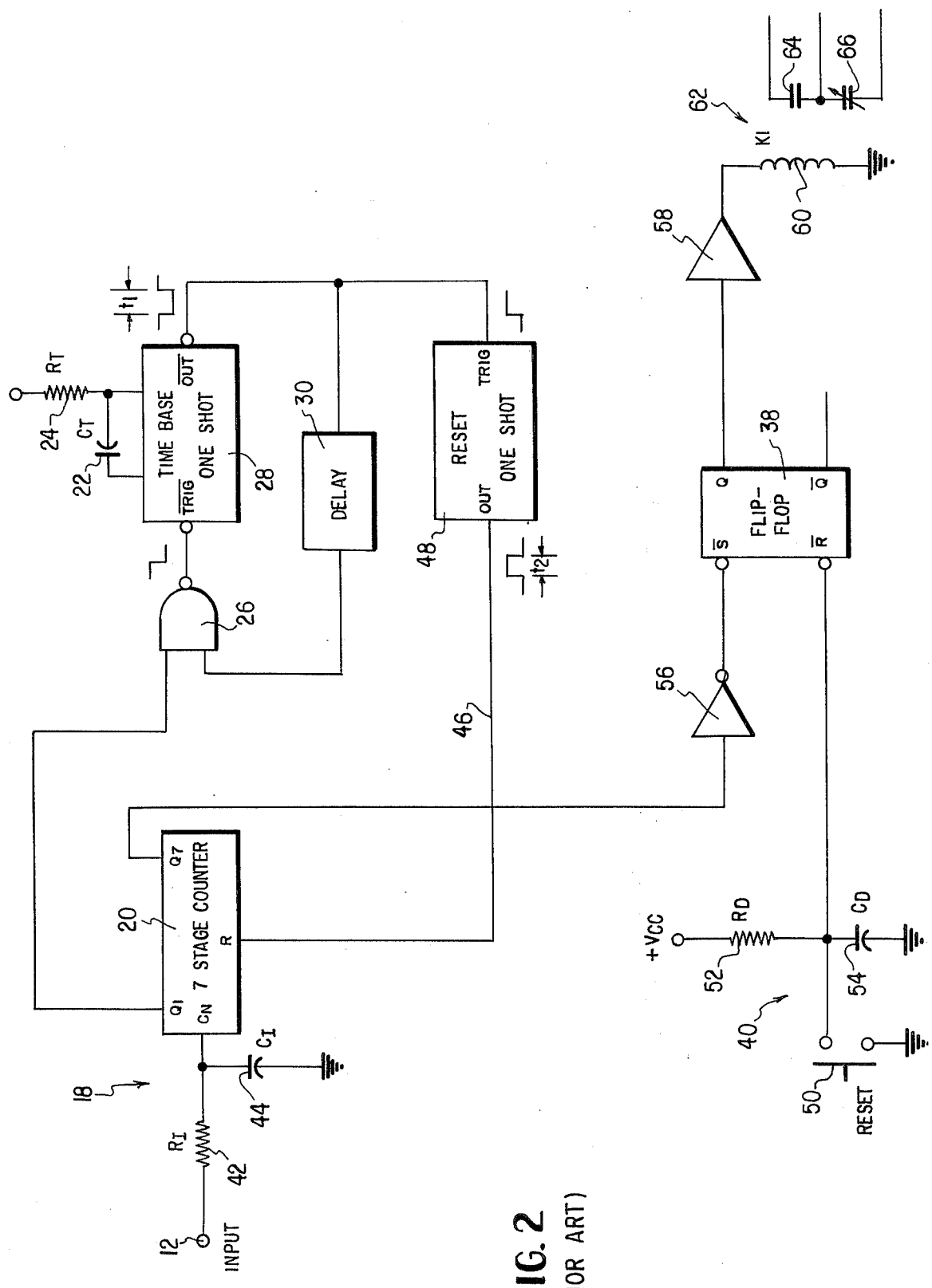
FIG. 2 is a detailed block diagram of a prior art speed switch useful in explaining the present invention.

FIG. 2 shows a prior art overspeed switch currently manufactured by the assignee of the present invention and having components common to the frequency dividing switch of FIG. 1 which bear like reference numerals. In FIG. 2, the input conditioning circuit 18 takes the form of a series resistor 42 in a shunt capacitor 44. A reset terminal of seven stage counter 20 is connected by a lead 46 to receive a signal from a reset one-shot multivibrator 48 having its trigger terminal connected to the output of the time base one-shot 28. The start up, clamp and reset circuit 40 comprises a manually operated reset switch 50, a resistor 52 and a capacitor 54. These are connected to the $\overline{R}$ input of flip-flop 38 having its $\overline{S}$ input connected to the seven stage counter by an inverter 56. The output of the flip-flop is shown in FIG. 2 as connected through an amplifier 58 to the coil 60 (K1) of a relay 62 having contacts 64 and 66 which operate when the coil 60 is energized for example to shut down the engine of a tractor.

In operation, the circuit of FIG. 2 provides a relay closure upon detecting a higher frequency signal at the frequency input terminal 12 than that which is set by the timing capacitor 22 and timing resistor 24 and the seven stage counter 20. By way of example only, input terminal 12 may be connected to a magnetic pickup in proximity to a gear, which provides a voltage signal at terminal 12 whose frequency varies directly as the speed of the gear.

Assume for initial conditions that the output of the reset one shot 48 was in its high state and has just switched low. It will be shown that at the end of the cycle this was a correct assumption.

After the reset one shot output has gone low the seven stage counter 20 is allowed to count. At the first negative transition of the $C_N$ input $Q_1$ will go high. Since the time base one shot 28 has been quiescent for a long time its output and also the output of the delay 30 is high. Since both inputs to the NAND gate 26 are high the output of this gate will be driven low, thus triggering the time base one shot 28.

The time base one shot 28 is of the "latching" type—that is, the trigger may be removed without affecting the time period $t_1$. This one shot does, however, require a reset time equal to or greater than $t_1$. This is the job of the reset one shot 48 which need not be of latching type and in the actual circuit is simply an RC differentiator.

Triggering the time base one shot 28 causes its output to go low and a short time thereafter (1–5uS) the output of the delay 30 goes low driving the input of NAND gate 26 low. This causes the output of NAND gate 26 to be high, preventing further trigger pulses (low going) from reaching the trig input of the time base one shot 28. Driving the input of the reset one shot 48 low causes no action at its output.

During time period $t_1$ the seven stage counter 20 is counting the input pulses received at its input $C_N$. Two possible actions may occur:
1. The counter 20 may count a total of 63 or more pulses during time period $t_1$.
2. The time base one shot 28 may "time out" before 63 pulses are accumulated in counter 20.

If the first action above occurs then the output of $Q_7$ of the counter 20 will go high driving the output of inverter 56 low, which is the not set ($\overline{SET}$) input of flip-flop 38. The output Q of flip-flop 38 is thus driven high and will remain so even if the output of inverter 56 subsequently goes high. The output of flip-flop 38 is sensed by a power amplifier 58 which turns relay 62 on, transferring the contacts of the relay, thereby causing an overspeed alarm.

If the second action above occurs, then the reset one shot 48 is triggered by the action of the time base one shot 28 timing out and going high. The reset one shot 48 output immediately goes high, thereby resetting the seven stage counter 20 and preventing further counting. The input to the delay 30 is also driven high and 1 to 5uS later the output of the delay goes high. The delay 30 is a necessary part of the device to prevent an immediate retriggering of the time base one shot 28 should $Q_1$ of seven stage counter 20 be high at the instant the time base one shot 28 times out. This condition could occur since parasitic delays associated with resetting seven stage counter 20 are longer than the time path from the output of time base one shot 28 to the input of gate 26 if delay 30 were not in the circuit. With delay 30 in the circuit, the time delay from the output of time base one shot 28 to input of gate 26 is made longer than the parasitic delays associated with resetting seven stage counter 20, and no false triggering of one shot 28 occurs. It was assumed initially that the output of one shot 48 was high and after its one shot time goes low. It is now apparent that this is the case, and that this action is the start of each timing cycle.

Start up delays and resets are accomplished by $R_D$ 52 and $C_D$ 54 which serves to reset flip-flop 38 during power up conditions. Reset switch 50 can reset flip-flop 38 after an overspeed condition occurs.

Input limiting components $R_I$ 42, $C_I$ 44 serve to prevent both excessive current and high frequency noise from entering the input $C_N$.

Figure 3:
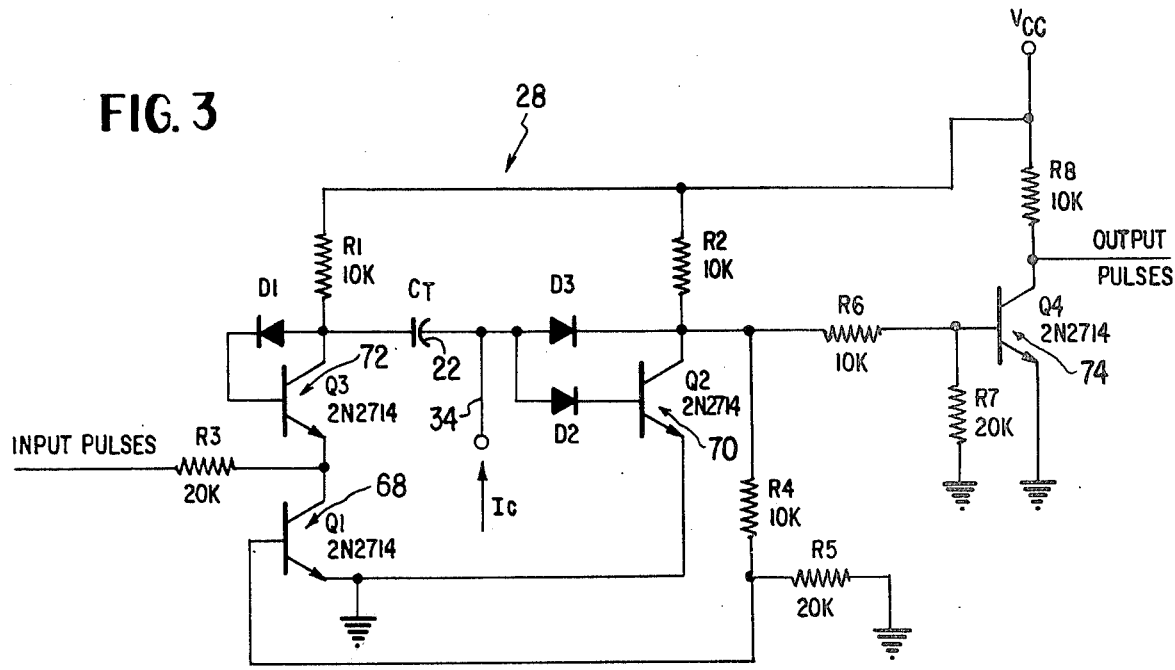
FIG. 3 is a circuit diagram of the one-shot multivibrator of FIG. 2.

FIG. 3 is a circuit diagram showing the construction of the time base one shot multivibrator 28. This circuit is essentially a temperature compensated one shot and is essentially similar to the one shot shown in FIG. 4 of assignee's U.S. Pat. No. 3,854,058. Reference may be had to that patent for a detailed discussion of the overall operation of the circuit. In addition to the three transistors 68, 70 and 72 labeled $Q_1$, $Q_2$ and $Q_3$, respectively, the circuit of FIG. 3 includes a fourth transistor 74 labeled $Q_4$. The addition of transistor $Q_4$ results in a negative output pulse from the circuit. A negative pulse may trigger the circuit as shown if it is applied to the junction of transistors $Q_1$ and $Q_3$.

FIG. 4 is a detailed diagram of the dividing frequency switch 10 of FIG. 1. Like parts bear like reference numerals in FIG. 4. The voltage to current converter 32 comprises a differential amplifier 76 and a transistor 78 labeled $Q_1$ in FIG. 4. Both the differential amplifier and the transistor are connected to a positive power supply plus $V_{CC}$, the latter through an emitter resistor 80 labeled $R_1$. Additional circuitry comprises a first voltage divider formed of resistors 82 and 84 labeled $R_2$ and $R_3$, a second voltage divider comprising resistors 86 and 88 labeled $R_4$ and $R_6$ and a third voltage divider comprising resistors 90 and 92 labeled $R_5$ and $R_7$.

As previously described, the speed portion of the circuit provides an alarm or output if the frequency input terminal 12 exceeded a value determined by $f > 63/t_1$ where $t_1 = R_T C_T \ln "2"$. In FIG. 4, $R_T$ is replaced by a current source $I_C$ on lead 34 and with this substitution $t_1$ approximately $= 2C_tV_{CC}/I$. The relay 62 in FIG. 4 will trip when $f > 63I/2C_TV_{CC}$ or $f/I > 63/2C_TV_{CC}$. With a conventional internal combustion engine speed transducer connected to input terminal 12 and a conventional internal combustion engine oil pressure transducer connected to input terminal 14, the relay is tripped and the motor either shut down or an alarm generated if engine speed/engine oil pressure $> 63/2C_TV_{CC}$. Many conventional oil pressure transducers commercially available provide a voltage output directly proportional to pressure and any of these can be connected to the input terminal 14. The result is a current $I_C$ at the collector of transistor 78 which is proportional to oil pressure.

In operation, the voltage to current converter functions by detecting current flow through resistor R1, which is approximately equal to $I_C$. The voltage across R1 is presented to the differential inputs of the amplifier 76 through voltage divider resistors R4, R6 and divider resistors R5, R7. If the input voltage from the pressure transducer is at zero volts the current through resistor R1 must also be at zero since any voltage across resistor R1 will tend to drive amplifier 76 output more positive, thereby shutting off transistor 78 (Q1) and reducing the current through R1 to zero. As the input voltage increases positive the voltage on lead 94 must decrease (representing an increasing $I_C$) in order that a balance be achieved at the amplifier 76 input terminals.

If the seven stage counter 20 is paralleled or replaced by a BCD (binary coded decimal) counter and suitable digital readout circuitry, a variation of the alarm may be achieved. This variation can display a number which may be scaled to read R.P.M. (revolutions per minute) per P.S.I. (pounds per square inch). This is, the number displayed would represent a scaled result of the computation $f/I$ or SPEED/OIL PRESSURE.

It is apparent from the above that the present invention provides an improved dividing frequency switch particularly adapted for use with tractor engines to give an alarm or engine cut off signal when the ratio of the engine speed to engine oil pressure becomes too great. Important features of the invention include the fact that it provides an output in response to the ratio of two different kinds of input signals, namely one signal which is a digital (frequency) signal and a second one which is an analog (voltage magnitude) signal. The analog input is first converted into current and then applied as a timing factor in a digital coding arrangement to produce a digital (on-off) output for use as an alarm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A switching circuit comprising first and second input terminals for receiving respective digital and analog electrical input signals, an output terminal for deriving an alarm output signal from said circuit, a digital counter coupled to said first input terminal, an analog time delay coupled to said second input terminal, said analog time delay being coupled to said digital counter to modify the count of said counter in accordance with the magnitude of an electrical analog signal at said second input, and means coupling said digital counter to said output terminal for producing an alarm signal at said output terminal when the count in said counter exceeds a predetermined value.

2. A circuit according to claim 1 wherein said counter comprises a binary counter.

3. A circuit according to claim 1 wherein said analog time delay circuit is coupled to said counter to vary the counting time of said counter.

4. A circuit according to claim 3 wherein said counter comprises a resettable counter.

5. A circuit according to claim 4 wherein said counter has a reset terminal, said analog time delay circuit being coupled to said reset terminal of said counter.

6. A switching circuit comprising first and second input terminals for receiving respective digital and analog electrical input signals, an output terminal for deriving an alarm output signal from said circuit, a digital counter coupled to said first input terminal, an analog time delay coupled to said second input terminal, said analog time delay being coupled to said digital counter to modify the count of said counter in accordance with the magnitude of an electrical analog signal at said second input, means coupling said digital counter to said output terminal for producing an alarm signal at said output terminal when the count in said counter exceeds a predetermined value, said analog time delay circuit being coupled to said counter to vary the counting time of said counter, said counter comprising a resettable counter, said counter having a reset terminal, said analog time delay circuit being coupled to said reset terminal of said counter, and wherein said analog time delay circuit comprises a one-shot mulitivibrator.

7. A circuit according to claim 6 wherein said analog time delay circuit comprises a capacitor which acts as a timing element for said multivibrator, and means coupling said second input terminal to said capacitor.

8. A circuit according to claim 7 wherein said means coupling said second input terminal to said capacitor comprises a voltage to current converter.

9. A switching circuit comprising first and second input terminals for receiving respective digital and analog electrical input signals, an output terminal for deriving an alarm output signal from said circuit, a counter having a reset terminal for controlling the length of the counting cycle of said counter, an analog time delay coupled to said counter reset terminal for varying the counting cycle of said timer in accordance with the period of said delay, and means coupling said analog time delay to said second input terminal.

10. A switching circuit according to claim 9 wherein said means coupling said analog time delay to said second input terminal comprises a voltage to current converter.

11. A switching circuit comprising first and second input terminals for receiving respective digital and analog electrical input signals, an output terminal for deriving an alarm output signal from said circuit, a counter having a reset terminal for controlling the length of the counting cycle of said counter, an analog time delay coupled to said counter reset terminal for varying the counting cycle of said timer in accordance with the period of said delay, and means coupling said analog time delay to said second input terminal, said means coupling said analog time delay to said second input terminal comprising a voltage to current converter, said analog time delay comprising a one-shot multivibrator having a timing capacitor, said voltage to current converter being coupled to said capacitor.

12. A switching circuit according to claim 11 wherein said counter comprises a plurality of binary stages, said one-shot multivibrator being coupled to the first stage of said counter.

13. A switching circuit according to claim 12 wherein said one-shot multivibrator has its input coupled to said first stage of said counter, and means coupling the output of said multivibrator to said reset terminal of said counter.

14. A switching circuit according to claim 13 including a time delay circuit coupled between the output and the input of said one-shot multivibrator.

15. A switching circuit according to claim 14 including a NAND gate having its output coupled to the input of said one-shot multivibrator, a first input of said NAND gate being coupled to the first stage of said counter and a second input of said NAND gate being coupled to the output of said time delay circuit.

16. A switching circuit according to claim 15 wherein said means coupling the output of said multivibrator to said reset terminal of said counter comprises a second one-shot multivibrator.

17. A switching circuit according to claim 16 including a relay coupled to said output terminal.

18. A switching circuit according to claim 17 including a reset flip-flop coupling the last stage of said counter to said output terminal, and a manual reset switch coupled to said flip-flop.

19. A switching circuit according to claim 16 wherein said voltage-to-current converter comprises a junction transistor having its emitter-collector circuit coupled to said timing capacitor of said one-shot multivibrator.

20. A switching circuit according to claim 19 including a differential amplifier coupling said second input terminal to the base of said junction transistor.

* * * * *